UNITED STATES PATENT OFFICE.

FRANKLIN BAKER, JR., OF PHILADELPHIA, PENNSYLVANIA.

PROCESS OF PREPARING OR TREATING COCOANUT AND PRODUCT OBTAINED THEREBY.

1,230,366.  Specification of Letters Patent.  Patented June 19, 1917.

No Drawing.  Application filed June 17, 1916. Serial No. 104,211.

*To all whom it may concern:*

Be it known that I, FRANKLIN BAKER, Jr., a citizen of the United States, residing in Philadelphia, Pennsylvania, have invented an Improved Process of Preparing or Treating Cocoanut and Product Obtained Thereby, of which the following is a specification.

My invention relates to the preparation, preservation and packing of fresh cocoanut; that is to say, the meat or kernel of the fruit whereby it will keep in a natural moist and fresh state for a relatively indefinite length of time. My improved product will have the same degree of moisture that is possessed by the green fruit, and is available for use for the same purposes that the fresh green cocoanut is employed.

The desiccation of cocoanut is an old and well known process. In fact, many methods have been developed in which the desiccation of the meat of the cocoanut kernel forms a necessary or important part, but as the name implies, all of this work has resulted in the production of a dry product, and in most instances a preservative has been added to the cocoanut.

The essential object of my invention is to provide a preserved cocoanut product having the original moisture and condition of fresh cocoanut; the whole being shredded or grated and packed in cans, glasses or other suitable forms of receptacles, which are hermetically sealed; such cocoanut having added to it, in lieu of the milk with which it is originally found, a certain proportion of a solution of sugar and water.

In carrying my process into effect, the cocoanuts are opened and the milk removed from the same. The kernel or meat of the cocoanut is then shredded or grated by any approved or well known means, and then the shredded or grated cocoanut is placed in the cans or other receptacles in which it is to be packed for sale and subsequent use. In the meanwhile, a solution of sugar and water in which the water is usually in excess of the sugar content has been prepared, being heated to a temperature substantially but preferably not exceeding that of the boiling point of water, and after the cans or other receptacles have been substantially filled with the shredded or grated cocoanut, a portion of this heated sugar and water solution, the amount used being directly proportionate to the amount of cocoanut in the cans or other receptacles, may be poured into the latter.

The cans are then hermetically sealed and placed in a retort or steam chest, into which steam is introduced and kept under pressure; the contents of the cans being raised to a temperature sufficient to kill any bacteria present in the cocoanut as well as any that may exist in the sugar solution added thereto. This temperature will vary, depending upon a number of factors.

In my work, I have found that a temperature at or slightly in excess of 212° F. may be sufficient under some conditions. Generally speaking and for the meat of most cocoanuts, the temperature may range from 215° F. to 225° F.; the temperature usually employed being about 220° F., although it is possible to raise the temperature to 250° F., without injury to the cocoanut. The cans with the contained cocoanut and sugar solution are maintained at the desired temperature until the cocoanut has been thoroughly heated through and the bacteria thereof destroyed.

The usual period of time for this heat treatment is approximately one-half hour, although in some instances it may be necessary or desirable to raise the temperature in the steam pressure chamber to the higher point, approximately 250° F., for a short period of time, and this may be necessary when treating some kinds of cocoanut in which the bacteria present can only be destroyed at the higher heat. This higher temperature is maintained for approximately five minutes. The cans are then withdrawn and allowed to cool at room temperature, and the product is then ready for market and subsequent use.

It will be understood, of course, that the bacterial content of the meat or kernel of the cocoanut varies within certain limits. In the treatment of cocoanut therefore while all of the bacteria of the contents of certain cocoanuts may be killed at the lower temperatures, others may require the higher temperatures.

In all instances, the high temperature treatment is for a shorter length of time than the treatment at the lower temperatures, and such high temperature treatment follows treatment at the lower temperatures, so that the material can be raised to the higher temperatures in a relatively short period of time. In my improved method of procedure in the treatment or preservation of cocoanut, no harm to the product will result in the employment of the relatively high temperatures for destroying the bacteria present.

In the preparation of my improved cocoanut product preserved and packed in cans or other receptacles, the heat treatment is the important factor, and this must be sufficient to kill the bacteria present in the raw cocoanut and any that may be present in the sugar solution packed with the cocoanut.

In some cases, however, where it is not desired to keep the packed cocoanut for any length of time, as for instance where its use is local or at points directly convenient to the place of manufacture, it will safely keep for short periods of time in hermetically sealed packages when treated by exposure to the lower temperatures. These temperatures under the conditions noted, will be sufficient to kill most, if not all, of the bacteria present and preserve the product in a perfectly sweet condition for a limited length of time. This is particularly desirable where the goods are used by confectioners and others under proper hygienic conditions and where final use may be effected in a relatively short period after packaging.

The finished product, when ready for use after cooling, will be found to be as fresh and moist as the grated or shredded cocoanut direct from the fresh green nut, and it may be used for all purposes for which the fresh kernel is employed.

Reference in the claims to the step of cutting, grating, shredding, or comminuting the cocoanut kernel is not to be construed as limiting my invention to any exact manner of preparing the kernel; such language being intended to include any method or means of finely dividing the kernel to make it readily available in carrying out my improved process and for subsequent use as an article of food.

I claim:

1. The process of preserving cocoanut in a natural moist condition, which consists in separating the milk from the cocoanut kernel, cutting, grating, or shredding the kernel, packing the same in receptacles, providing a solution of sugar and water, heating the same, introducing a portion of the heated sugar solution into the receptacles with the prepared cocoanut kernel, hermetically sealing said receptacles, and then subjecting the hermetically sealed receptacles to a high temperature sufficient to kill the bacteria present in the cocoanut.

2. The process of preserving cocoanut in a natural moist condition, which consists in separating the milk from the kernel, cutting, grating, or shredding the kernel, packing the same in receptacles, providing a solution of sugar and water, heating the same, introducing a portion of the heated sugar solution into the receptacles with the prepared kernel, hermetically sealing said receptacles, and then subjecting the hermetically sealed receptacles to a temperature approximating 220° F. for approximately one-half hour.

3. The process of preserving cocoanut in a natural moist condition, which consists in separating the milk from the kernel, shredding the kernel, packing the shredded cocoanut in receptacles, providing a solution of sugar and water, heating such solution to a temperature approximating 212° F., introducing a portion of the sugar solution into the shredded mass of the kernel, hermetically sealing the receptacles in which the shredded cocoanut and sugar solution are placed, and then subjecting the hermetically sealed receptacles to a high temperature sufficient to kill the bacteria present in the cocoanut and the sugar solution.

4. The process of preserving cocoanut in a natural moist condition, which consists in separating the milk from the kernel, shredding the kernel, packing the shredded cocoanut in cans, providing a solution of sugar and water, heating such solution to a temperature approximating 212° F., introducing a portion of the sugar solution into the shredded mass of the kernel, hermetically sealing the cans in which the shredded cocoanut and sugar solution are placed, then subjecting the hermetically sealed cans to a high temperature approximating 220° F., for a period of time approximating one-half hour, and finally cooling the contents of the filled cans.

5. The process of preserving cocoanut in a natural moist condition, which consists in separating the milk from the kernel, shredding the kernel, packing the shredded cocoanut in cans or other receptacles, providing a solution of sugar and water, heating such solution to a temperature approximating 212° F., introducing a portion of the heated sugar solution into the shredded mass of the kernel, hermetically sealing the receptacles in which the shredded cocoanut and sugar solution are placed, then subjecting the hermetically sealed cans to a high temperature approximating 220° F. for a period of time approximating one-half hour, increasing the temperature to approximately 250° F. for a short period of time, and finally cooling the contents of the filled cans.

6. The process of preserving cocoanut in a natural moist condition, which consists in separating the milk from the cocoanut kernel, cutting, grating, or shredding the kernel, packing the same in receptacles, providing a solution of sugar and water, heating the same, introducing a portion of the heated sugar solution into the receptacles with the prepared cocoanut kernel, hermetically sealing said receptacles, and then subjecting the hermetically sealed receptacles to steam under pressure at a temperature not exceeding 250° F. to kill the bacteria present in the cocoanut.

7. As a new article of manufacture, a completely sterilized mass of cocoanut in a shredded or comminuted state without the milk together with a sugar solution.

8. As a new article of manufacture, a hermetically sealed completely sterilized package of cocoanut kernel in a shredded or comminuted state without the milk together with a sugar solution.

FRANKLIN BAKER, Jr.